United States Patent [19]

Doucet

[11] Patent Number: 5,397,470
[45] Date of Patent: Mar. 14, 1995

[54] FILTER WITH CLEANING BY DIRECT SCAVENGING

[76] Inventor: Charles Doucet, 13, avenue Leonard-Sismondi, 1224 Chene-Bougeries (Geneva), Switzerland

[21] Appl. No.: 70,309
[22] PCT Filed: Oct. 8, 1992
[86] PCT No.: PCT/CH92/00205
§ 371 Date: Jun. 3, 1993
§ 102(e) Date: Jun. 3, 1993
[87] PCT Pub. No.: WO93/06909
PCT Pub. Date: Apr. 15, 1993

[30] Foreign Application Priority Data

Oct. 11, 1991 [CH] Switzerland ............ 02 996/91

[51] Int. Cl.⁶ ................................ B01D 29/92
[52] U.S. Cl. ............... 210/323.2; 210/332; 210/340; 210/418; 210/459; 210/460
[58] Field of Search .............. 210/323.2, 332, 340, 210/346, 418, 419, 420, 422, 433.1, 456, 459, 460, 461, 107

[56] References Cited

U.S. PATENT DOCUMENTS

| | | | |
|---|---|---|---|
| 3,169,109 | 2/1965 | Hirs | 210/107 |
| 4,339,333 | 7/1982 | Sjoberg | 210/411 |
| 4,781,825 | 11/1988 | Grimes et al. | 210/107 |
| 5,152,895 | 10/1992 | Doucet | 210/340 |

FOREIGN PATENT DOCUMENTS

| | | |
|---|---|---|
| 309170 | 11/1955 | Switzerland . |
| 516331 | 1/1972 | Switzerland . |
| 532409 | 2/1973 | Switzerland . |
| 597894 | 4/1978 | Switzerland . |
| 678400 | 9/1991 | Switzerland . |
| 1021987 | 3/1966 | United Kingdom . |
| WO90/12634 | 11/1990 | WIPO . |

*Primary Examiner*—Robert A. Dawson
*Assistant Examiner*—W. L. Walker
*Attorney, Agent, or Firm*—Young & Thompson

[57] ABSTRACT

The filter comprises a tubular body (1) provided with fixing flanges (2,3) for a fluid pipe. An upstream distributing plate (4) is perforated with orifices and extended by sockets (5) which are engaged in the up-stream ends of filtering elements (6). These elements (6) extend axially inside of the body (1). The filter comprises in its downstream part a collector (12) provided with bevelled tubes (13) which are engaged in the down-stream ends of the filtering elements (6). This collector (12) is continued by an elbow (11) which is followed by a single flush branching (7) opening laterally outside of the body (1).

13 Claims, 1 Drawing Sheet

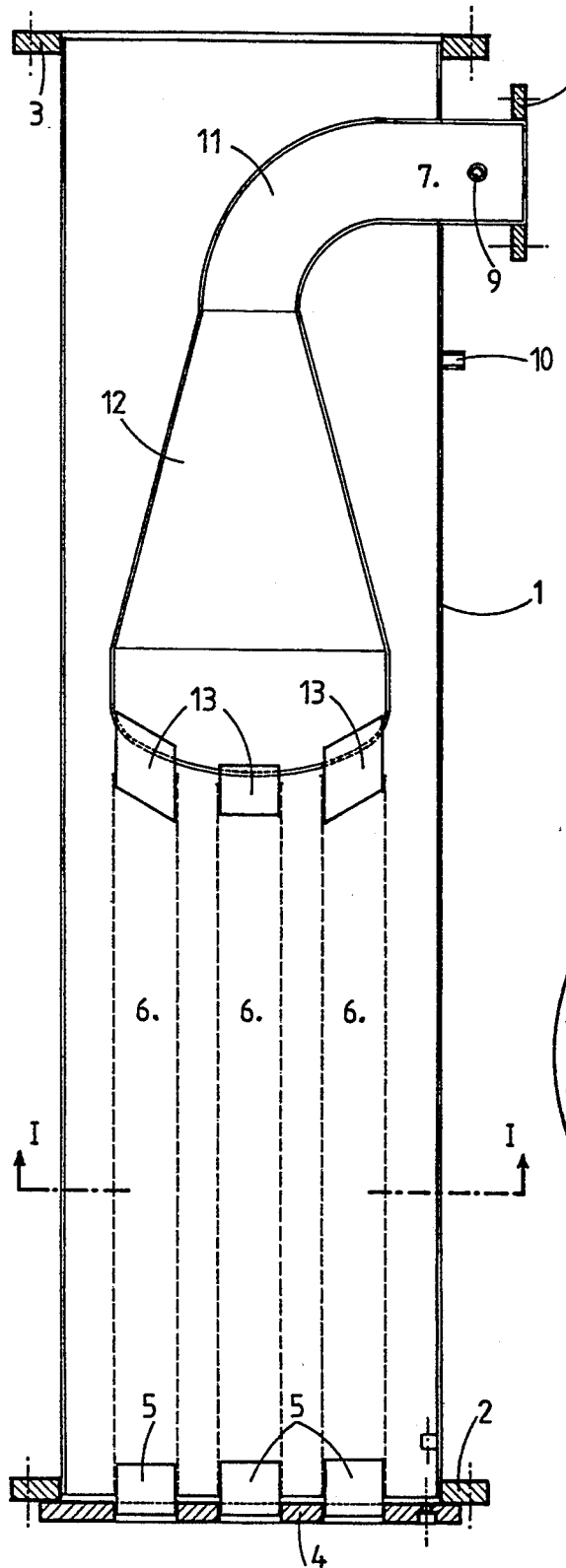
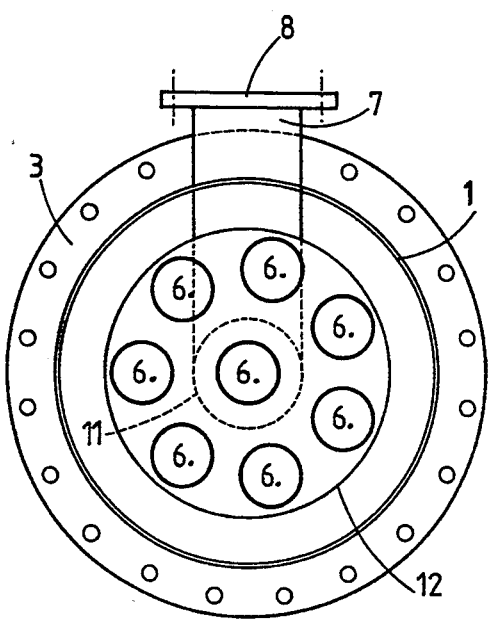
FIG. 1
FIG. 2

FILTER WITH CLEANING BY DIRECT SCAVENGING

FIELD OF THE INVENTION

The present invention relates to a filter intended to be mounted in a fluid pipe, particularly in a pipe for untreated water, having a diameter substantially equal to that of the body of the filter.

BACKGROUND OF THE INVENTION

Generally speaking, automatic fast filters are provided with motorized mechanical systems for ensuring their cleaning and are always cleaned by back wash.

These mechanical systems need a pluri-metallic construction, thus corrosive, and the cleaning by back wash induces a risk of tacking and/or felting of the filtering elements when the water to be filtered contains fibers.

Swiss patents Nos. 516.331, 532.409, 597.894 and 678.400 in the name of the applicant provide solutions to the above mentioned disadvantages as they describe filters with cleaning by direct scavenging of the filtering surface. Patents Nos. 516.331 and 532.409 disclose a simple mono-element filter with laminar cleaning on a tubular filtering element, in which a current of untreated water is flushed at the moment of cleaning by opening of a flush valve normally closed. These two patents also explain the evolution of a virtual filtration ring developing from down-stream to up-stream according to the stage of clogging of the filter. This theory allows to design a multielement filter with several finenesses, described in patent No. 597.894 in which each filtering element is extended by a knee crossing through the body of the filter by a branching and a flushing valve, normally closed. All these individual flush branchings are then connected to a flushing collector. These filters work perfectly, but they are expensive to manufacture, because of the multiplication of the flush branchings and of the valves.

Patent 678.400 allows to lower the manufacturing cost of such filters by introducing a turbo-distributor which brings into contact each filtering element one after the other with one single flush outlet. This allows to have only one flush branching and only one automatic valve (instead of 6 or 8), to suppress the flushing collector and to simplify the installation and the programming of such a filter. Nevertheless the latter presents the following disadvantages:

The rotor of the turbo-distributor is an expensive part relatively complex to manufacture. In the presence of untreated water charged with impurities, one observes a wear of the moveable parts, such as the rotor of the turbo distributor. In certain extreme conditions, the rotor may grip, which needs a disassembling of the filter and thus the temporary closure of the water pipe of the filter.

SUMMARY OF THE INVENTION

The multi-element filter according to the present invention with cleaning by direct scavenging intended to be mounted in a fluid pipe allows to prevent the abovementioned disadvantages and is characterized by the features defined in claim 1.

BRIEF DESCRIPTION OF THE DRAWINGS

The attached drawing illustrates schematically and by way of an example an embodiment of the filter according to the present invention.

FIG. 1 represents a longitudinal section of the filter according to the invention.

FIG. 2 is a cross-section according to line I—I of FIG. 1.

DETAILED DESCRIPTION OF THE INVENTION

The filter illustrated in FIG. 1 comprises a tubular body 1 with a diameter which is substantially equal to that of the pipe in which it has to be mounted. The body 1 is provided at both of its ends with flanges 2,3 allowing to fix it to the said pipe. The up-stream end of the body 1 is provided with a distributing plate 4 in contact with flange 2, perforated with orifices and affixed to body 1 of the filter by screws (not shown). This plate 4 comprises sockets 5 emerging inside of the body and feeding the tubular filtering elements 6 which extend axially inside of the body 1. The upstream end of said elements is engaged on one of said sockets 5.

The body 1 comprises on its down-stream part a single flush branching 7 connecting the inside of body 1 to the outside. This flush branching 7, in the form of a tube of small diameter, is provided with a flange 8 allowing to connect it to a flushing valve (not shown), preferably automatic, which normally is closed. The flush branching 7 is provided with a branching 9 of small diameter, which permits its connection to a measuring device for the upstream pressure. On its downstream part the body 1 is also provided with a branching of small diameter 10 allowing to connect thereon a measuring device for the downstream pressure of the filter. These two pressure measuring devices permit to know the pressure drop (untreated water/filtered water) of the filter.

The flush branching 7 is connected inside of the body I by means of an elbow 11 to a chamber 12 having the function of a collector whose general form is that of a rotational solid. The form of this chamber in the embodiment shown is conical widening out towards the up-stream end of the filter. The up-stream end proper of this collector is cylindrical and its front wall is preferably convex, generally in the form of a portion of a sphere. Said front wall may also be flat.

Bevelled tubes 13 of a diameter corresponding to the sockets 5 integral with the distributing plate 4 and aligned with these sockets are affixed to the front wall through which they cross starting from the up-stream part of the chamber forming the collector 12. These tubes engage with the down-stream end of the filtering elements 6.

The fact that the tubes 13 are bevelled facilitates the mounting of the filtering elements and allows to avoid to bevel the up-stream end of these tubes 13.

This construction allows to provide a central filtering element 6, located on the axis of the filter and not only a ring of filtering elements as in the rotor monobranching filters. The filtration capacity of the filter is thus increased for the same diameter and the same length of the latter.

When fitted in the pipe of fluid to be filtered by means of the flanges 2,3, the filter works in the following manner:

In the case of water filtration, the water to be filtered enters with a speed generally comprised between 2 and 15 m/s across the up-stream distributing plate 4 in the filtering elements 6 and flows out through each of these elements on their down-stream end in the form of a narrow virtual ring which constitutes the filtering zone of the element. By passing through the filtering elements, the untreated water deposits its impurities which form a tight sleeve displacing the virtual filtration ring from down-stream to up-stream. The water thus filtered flows in the annular space located between the tubular body of the filter and the collector 12 towards the down-stream outlet of the filter.

Progressively during its use, the annular zones of filtration rise towards the up-stream part of the filter and finally clog up the latter. It results in an increase of the pressure drop detected by the pressure measuring devices which automatically start a washing cycle of the filter. Practically it is preferable to start this washing cycle of the filter before the clogging, for example by means of a programmed timer, in order to avoid a pressure drop in the pipe.

The washing cycle lasting about 10 to 25 seconds is initiated by opening of the flush valve (not shown) located at the end of the flush branching 7. This flush branching 7, connected by means an elbow 11 to chamber 12, drains all the filtering elements 6 simultaneously at one and the same time. The truncated conical form of chamber 12, getting narrower towards the down-stream part of the filter, increases the flushing effect by creating a whirling movement. It should be observed that a cylindrical non-conical collector may also give an acceptable efficiency.

During the periodical flushing, the flush flow ranges at about 30% of the nominal flush; it follows during the flushing an increase of the total flow absorbed by the filter. This increase is generally assured without trouble by the hydraulic circuit. If the filter functions at a nominal speed of 7.5 m/s in the filtering elements, the increase of the flow caused by the flushing modifies the speed to approximately 10 m/s, thus guaranteeing a perfect cleaning of the filtering elements by direct scavenging.

This short periodical flushing allows extremely low consumption of untreated washing water; practice shows that this consumption is lower than one percent in normal filtration. The filter remains functional even for lower nominal speeds in the range of 5–6 m/s. As a matter of fact even in these cases a scavenging speed in the range of 6.5 m/s is obtained during the flushing of the filter which is sufficient.

In extreme cases, as in presence of heavily charged water and if the filter is clogged, it is possible to close the output valve of the filter during the flushing; this causes the differential pressure which presses the impurities against the filtering elements to be reduced to zero and allows the evacuation of said impurities by direct scavenging during the flushing. The duration of the flushing being very short, in the range of some tens of seconds, the temporary interruption of the hydraulic circuit is of no consequence.

It should be observed, that an elementary filter constituted by only one filtering element continued by a flushing valve of the same diameter as the element leads to a flushing flow which is incompatible with the possibilities of the pipe net. It is therefore necessary to reduce the flushing circuit. Experience shows that in these conditions the active vein (which presents a sufficient speed) has substantially the same diameter as the reduced flushing orifice and, around this axial column of water, a zone of lower speed travels through the surface of the filtering element without cleaning it. The advantage of a multi-element with single flushing is to avoid this disadvantage; one obtains indeed a sufficient filtering surface, a flushing of a reduced section compatible with the possibilites of the pipe net and the flow of the filtering elements is not unitarily reduced; the scavenging speeds are thus highest along the filtering surfaces allowing perfect cleaning.

The advantage of such a filter can be resumed as follows:

A multi-element filter, eventually with variable fineness, allowing to clean the elements by direct scavenging during short periodical flushings which clean the whole filtering elements at one and the same time without causing an important pressure drop.

This filter does not include any mobile part liable to wear in heavy working conditions (water heavily charged with impurities). The filter is thus entirely static and its manufacturing costs are about twice lower than the known filters, while guaranteeing the same efficiency, as it is easy to manufacture and to assemble in great series.

In a variant, it is possible to provide deflector means inside the collector 12, for example blades, causing a whirling flow of the water during the flushing of the filter. Such a whirling flow improves the flush action and the cleaning of the filter by increasing the flow speed of the water and by creating hydraulic vibrations in this flow.

The fact to provide a central filtering element 6, located on the axis of the filter, allows also to create a whirling flow during the flushing of the filter, while it increases the nominal flow of the filter of equal size.

The filter according to the present invention is the optimum realisation for a filter of this type; it combines a very great reliability (no mobile part) with a very low price, its elements being easy to manufacture and to assemble, whilst ensuring a fast filtration in the range of 50 to 1000 microns, preferably of 100 to 500 microns.

I claim:

1. In a filter with cleaning by direct scavenging intended to be mounted in a fluid pipe, comprising: a tubular body of a diameter substantially equal to that of the pipe, an up-stream distributing plate comprising a plurality of orifices feeding each an end of a tubular filtering element extending axially inside of the body, the improvement wherein the down-stream end of all filtering elements are permanently and directly connected to a same and single flushing branching opening laterally outside of the body and intended to be equipped with a valve.

2. A filter as claimed in claim 1, wherein the filtering elements are connected to said flushing branching by means of a frusto conical chamber (12) and an elbow (11).

3. A filter according to claim 2, wherein the frusto conical chamber has a truncated conical form widening out towards the up-stream part of the filter.

4. A filter according to claim 3, wherein the up-stream part of the frusto conical chamber presents a cylindrical portion.

5. A filter according to claim 3, wherein the up-stream face of the chamber is convex.

6. A filter as claimed in claim 2, further including a series of first filtering elements disposed along a circumference and at least one second filtering element disposed centrally of said other filtering elements.

7. A filter as claimed in claim 6, wherein only one second filtering element is provided, located concentrically to the body of the filter.

8. A filter according to claim 2, wherein the base of the chamber comprises bevelled tubes intended to engage with the down-stream end of the filtering elements, whilst the upstream end of each of the filtering elements is engaged with sockets integral with the distributing plate.

9. A filter according to claim 2, wherein the chamber comprises means creating during the flushing a whirling flow and/or hydraulic vibrations in the flow.

10. A filter according to claim 1, wherein the filtration fineness of the filtering elements is comprised between 50 and 1000 microns.

11. A filter according to claim 10, wherein the filtration fineness of the filtering elements is comprised between 100 and 500 microns.

12. A filter according to claim 1, wherein said filter is constituted exclusively by static parts.

13. A filter according to claim 1, further including a series of filtering elements arranged in a ring and a central filtering element located on the axis of the filter.

* * * * *